United States Patent [19]
McCauley

[11] Patent Number: 5,328,334
[45] Date of Patent: Jul. 12, 1994

[54] WIND LINE POWER SYSTEM

[76] Inventor: Richard W. McCauley, Box 19A, Shushan, N.Y. 12873

[21] Appl. No.: 55,278

[22] Filed: May 3, 1993

[51] Int. Cl.$^5$ .............................................. F03D 11/00
[52] U.S. Cl. .............................. 416/196 A; 416/132 B
[58] Field of Search ...................... 416/DIG. 6, 9, 124, 416/194, 196 A, 132 B, 194 A, 198 R, 200 R

[56] References Cited

U.S. PATENT DOCUMENTS

| | | | |
|---|---|---|---|
| 205,053 | 6/1878 | Chase | 416/200 |
| 1,811,441 | 6/1931 | Smith | 416/196 A |
| 4,087,990 | 5/1978 | Gillette | 64/2 |
| 4,165,468 | 8/1979 | Fry et al. | 290/55 |
| 4,708,592 | 11/1987 | Krolick et al. | 416/196 A |

*Primary Examiner*—Edward K. Look
*Assistant Examiner*—Mark Sgantzos
*Attorney, Agent, or Firm*—Charles J. Brown

[57] ABSTRACT

A wind line power system in which a series of rigid rods are connected end-to-end to permit relative angular movement and transmission of axial torque from one rod to the next, with propellers extending laterally from and coaxial with each rod to convert wind force vectors substantially parallel to the rods to cumulative unidirectional axial torque on all of the rods which in turn drives an electrical generator.

11 Claims, 2 Drawing Sheets

WIND LINE POWER SYSTEM

BACKGROUND OF THE INVENTION

Wind driven electrical turbines are well known and one of their forms is known as a wind line, which is a series of wind driven rotors affixed along the length of a flexible power shaft with one end of the shaft in a rotatable bearing and the opposite end connected in driving relation to an electrical generator.

One form of wind line power system in the prior art is described in U.S. Pat. No. 4,708,592 which employs a kind of wind screw formed of flexible fabric sheet which imparts rotation to a generator. Another prior art wind line power system is described in U.S. Pat. No. 4,165,468 in which wind driven rotors are affixed along the length of a flexible power shaft suspended at great height above the earth. Another is described in U.S. Pat. No. 4,087,990 wherein a series of tetrahedral links form a chain which rotates in the wind by means of sails to transmit rotation to an electrical generator.

Each of these and other known prior art wind line power systems are quite complicated and comprise many hundreds of parts. It is the principal object of the present invention to provide a wind power system of the utmost simplicity and efficiency and to do so by employing as a drive shaft a series of end-to-end rods flexibly connected so as to transmit torque from one rod to the next and ultimately to the drive shaft of an electric generator, with simple windmill-type propellers affixed cross-wise to each of the rods. No such rods form the drive shaft of any of the known prior art designs nor do any of them include propellers extending laterally from anything like drive shaft rods.

SUMMARY OF THE INVENTION

The wind line power system of the invention comprises a series of rigid rods arranged end-to-end. Connector means join adjacent pairs of the rods in a series permitting both relative angular movement and transmission of axial torque between the joined rods. Propeller means extend laterally from at least some of the rods for converting wind force vectors substantially parallel to the rods into cumulative unidirectional axial torque on all of the rods. Driven power input means axially rotatably support an end rod at one end of the series and end bearing means axially rotatably support an end rod at the opposite end of the series.

In a preferred form of the invention the connector means are axially as well as angularly flexible so as to undergo limited torsion before transmitting axial torque between the joined rods. The series of rigid rods may be mounted above the ground in a substantially horizontal position and may include intermediate bearing means within which associated rods can rotate and be supported. Each intermediate bearing means may be substantially vertically suspended from an overhead support line substantially parallel to the series of rigid rods. Guy lines may extend from each intermediate bearing means to the ground.

The driven power input means and the end bearing means may both be anchored to and elevated above the ground. The driven power input means may be a rotatable drive shaft of an electrical generator.

Each propeller means may include propeller blade spars extending substantially perpendicularly through and spaced axially apart on the associated rod. The spars may be skewed with respect to one another and sheet material may extend between the spars to define respective propeller blade surfaces. The propellers may be affixed to the respective rods with positions alternating 90° apart from one propeller to the next along the series of rods when all limited torsion is taken up and axial torque is being transmitted through all of the rods.

DESCRIPTION OF PREFERRED EMBODIMENT

Figure 1:
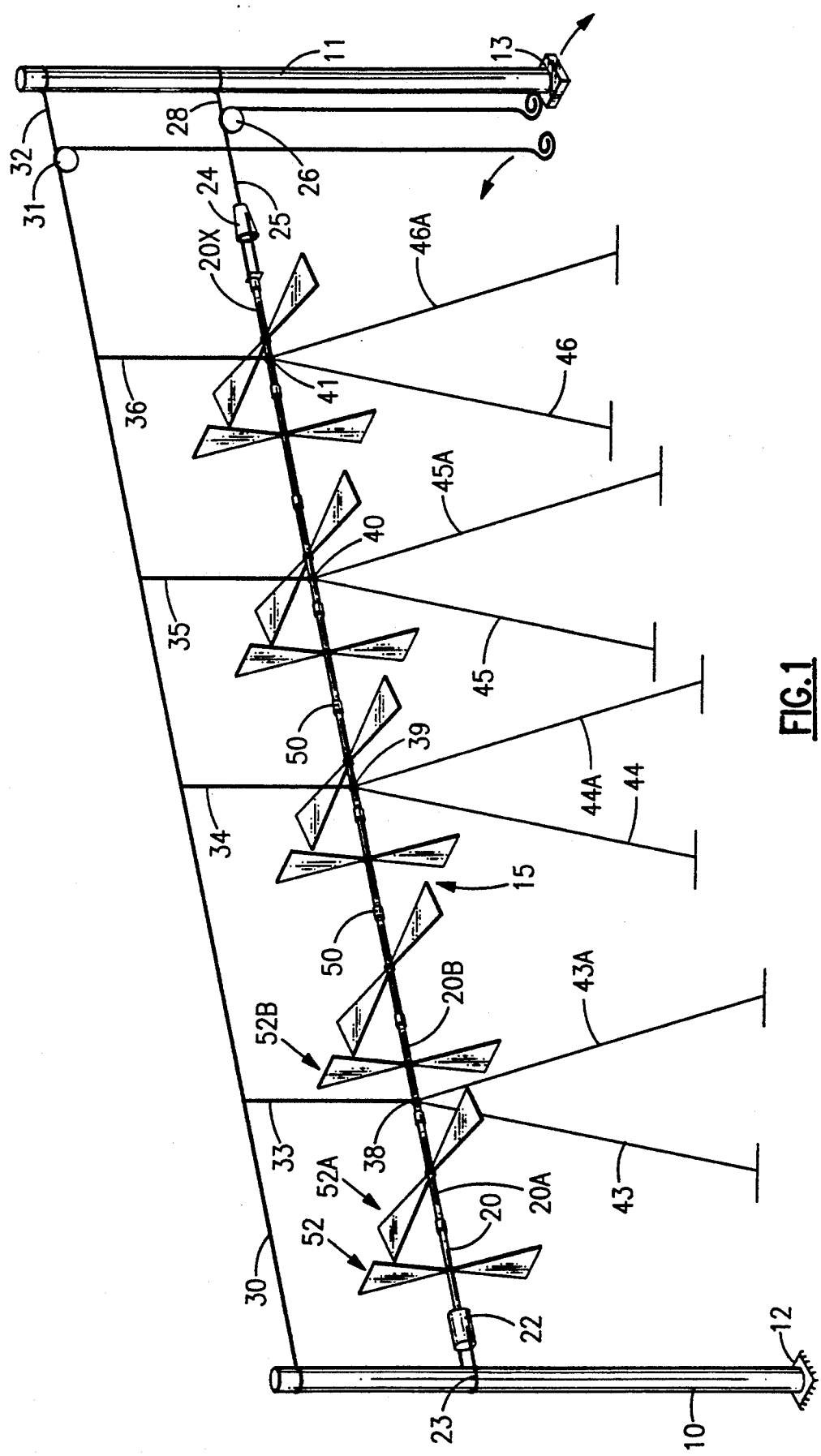
FIG. 1 is a perspective view of the wind line power system of the invention fully assembled and installed.

In FIG. 1 the complete assembly of the wind line power system of the invention is shown. It includes spaced posts 10 and 11 extending above the ground. The post 10 is anchored in a stationary base 12 and the post 11 is on a movable standard 13. Extending between the posts 10 and 11 is a substantially horizontal wind line 15 elevated above the surface of the ground. As will be apparent from the discussion below the wind line 15 may be angularly displaceable so that it can be aligned with prevailing wind, and it is for this reason that the post 11 is illustrated as movable with respect to the post 10. Specifically, the post 11 may be moved on its standard 13 in an arc about the centerline of the post 10 as shown by the arrows in FIG. 1. This example of means for changing the direction of the windline 15 is to be understood to be somewhat schematic and not necessarily the actual manner in which the wind line 15 may be made angularly movable about the post 10. As an alternative, for example, the end of the wind line 15 remote from the post 10 could be movable along a horizontal support line into different angular positions depending upon the direction of the prevailing wind.

Figure 2:
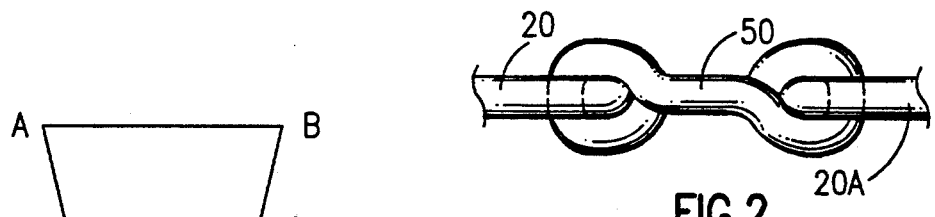
FIG. 2 is an enlarged fragmentary view of the end portions of two adjacent rods joined by a preferred form of the connector means.

The wind line 15 includes a series of rigid rods 20, 20A, 20B, etc. of plastic, light metal or wood arranged end-to-end above the ground. As shown in FIG. 2 the adjacent ends of the rods are preferably rounded. An electric generator 22 is affixed to the post 11 by straps 23 or the like which prevent axial rotation of the generator, and the extremity of the end rod 20 of the series of rods is attached in torque transmitting fashion to a rotatable drive shaft of the generator 22. At the opposite end of the wind line 15 another end rod 20X is rotatably supported at its extremity by a bearing 24 attached to a tension line 25 which passes over a lock-type pulley 26 and extends down to the ground. The pulley 26 in turn is secured to the post 11 by a strap 28 or the like on the post 11 at an elevation substantially the same as the elevation of the generator 22 on the post 10. The tension line 25 may be pulled tight from the ground to hold the wind line 15 taut by locking of the pulley 26.

An optional overhead support line 30 extends horizontally from the upper portion of the post 10 to the upper portion of the post 11 where it passes over a second lock-type pulley 31 secured to the post 11 by a strap 32. The support line 30 may also be pulled tight from the ground and held in taut position by locking of the pulley 31. Vertical suspension lines 33, 34, 35 and 36 extend downwardly from the overhead support line 30 to respective bearings 38, 39, 40 and 41 within which associated rods can rotate and be supported. For example, the bearing 38 is mounted on the rod 20B. These bearings 38 to 41 permit rotation of the respective rods passing therethrough and prevent sagging of the wind line 15 throughout its length and loading on the generator 22 and the bearing 24. Optional pairs of guy lines 43-43A, 44-44A, 45-45A and 46-46A diverge at a angle of approximately 120° from one another from the respective bearings 38 to 41 to anchor points in the ground. The function of the guy lines is to resist lateral swaying of the wind line 15.

Adjacent pairs of the rods of the wind line 15 are joined by articulated connectors as shown particularly in FIG. 2. In that embodiment the connector is a looped nylon cord 50 extending through lateral holes in the adjacent ends of the rods 20 and 20A of the pair. When the rod 20A is rotated axially it imparts limited twisting of approximately one full turn in the cord 50 before transmitting axial torque to the next rod 20. This form of articulated connector permits both relative universal angular movement between adjacent pairs of rods and transmission of axial torque between them. It also permits smooth torque transmission even when adjoining rods are at an included angle with respect to one another of as much as 135°, with little loss of transmitted torque. Other connectors are also appropriate, such as universal mechanical joints. In addition the selected form of connector may also be used between the drive shaft of the generator 22 and the end rod 20 and the opposite end rod 20X and the inner race of the bearing 24.

The rods 20, 20A, 20B, etc. support respective lateral coaxial windmill-type propellers 52, 52A, 52B, etc. as shown in FIG. 1. When all of the connector cords 50 are twisted to their full limited extent so that axial torque can be transmitted through all of the rods in the wind line 15, the propellers affixed to the respective rods alternate 90° apart from one propeller to the next along the series of rods as shown in FIG. 1. Thus the propeller 52 is then vertical, the propeller 52A is horizontal, the propeller 52B is vertical, and so on when all limited torsion in the connectors is complete. It has been found that this relative positioning of the series of propellers increases their efficiency in converting wind force vectors which are substantially parallel to each associated rod into cumulative unidirectional axial torque on all of the rods.

Figure 6:
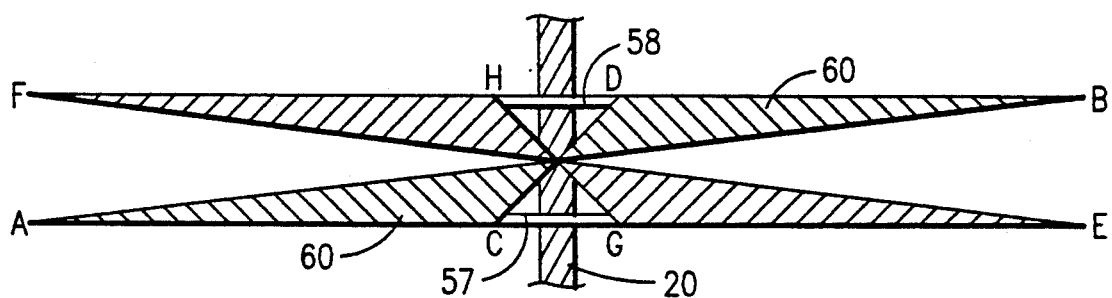
FIG. 6 is an enlarged view of the propeller of FIG. 2 looking down at the blades of the propeller on end.
Figure 3:
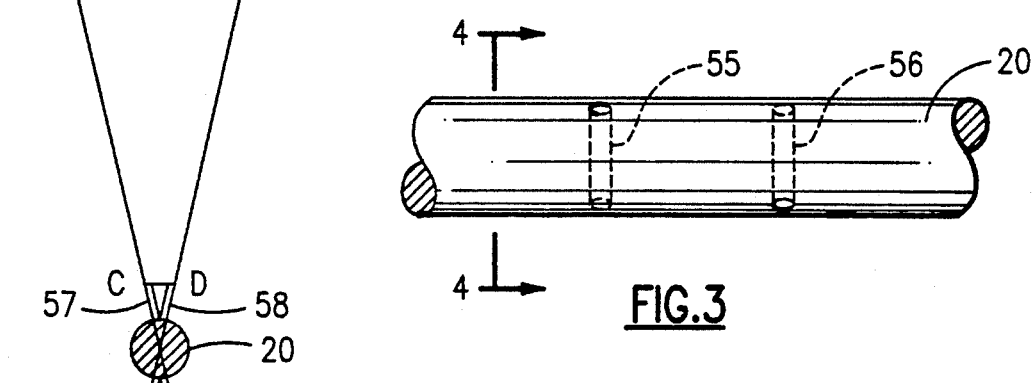
FIG. 3 is an enlarged fragmentary view of a section of one of the rods showing the holes therein for receiving the propeller spars.
Figure 4:
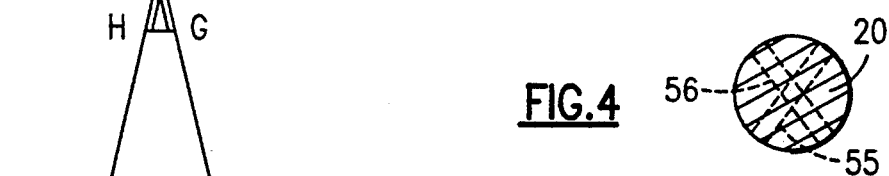
FIG. 4 is a lateral section taken along the line 4—4 of FIG. 3.
Figures 5, 7:
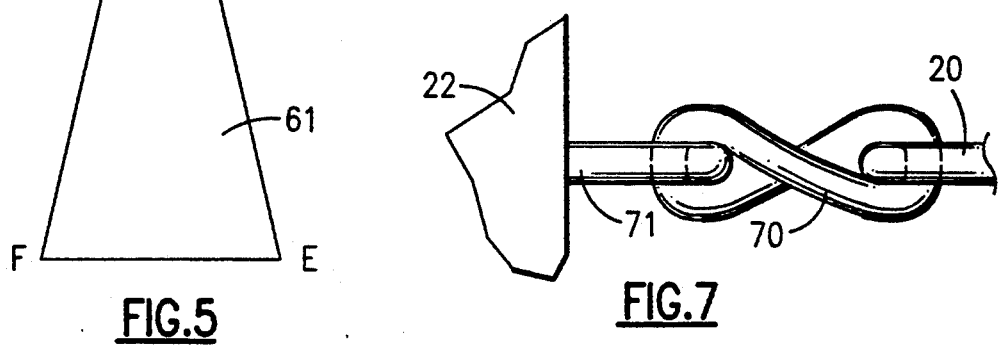
FIG. 5 is a lateral section taken through the wind line showing one of the double bladed propellers on one of the rigid rods.
FIG. 7 is an enlarged fragmentary view of the end rod joined by the preferred form of the connector means to the drive shaft of a generator.

A preferred construction for the respective propellers is shown in FIGS. 3 to 5. Axially spaced transverse skewed holes 55 and 56 are formed approximately in the midpoint of each of the rods such as in the rod 20 shown in FIG. 3. The skewing between the holes 55 and 56 is approximately 25°. As shown in FIGS. 5 and 6 a propeller blade spar 57 extends through the hole 55 and a similar propeller blade spar 58 extends through the associated hole 56. The spars may be of plastic, light metal or wood and are stiff. Both spars 57 and 58 are of the same length. Because of the configuration of the holes 55 and 56 the spars 57 and 58 are substantially perpendicular to the associated rod 20 and are spaced axially apart and skewed with respect to one another. The upper outer end of the spar 57 nearer the viewer in FIG. 5 has been marked with the letter A and the upper outer end of the rearward spar 58 away from the viewer in FIG. 5 is marked with the letter B. Similarly the lower outer end of the nearer spar 57 has been marked with the letter E and the lower outer end of the rearward spar 58 has been marked with the letter F.

An upper propeller blade 60 and a lower propeller blade 61 are provided, each being a sheet of flexible fabric such as nylon cloth of somewhat truncated triangular shape. The blade 60 is fastened to the spars 57 and 58 to extend between the points A and B and also between the points C and D closer to the associated rod 20. Similarly the blade 61 extends between the points E and F and also between the points G and H closer to the associated rod 20. Thus on the nearer spar 57 the corners of the blades 60 and 61 are attached at the points A, C, G and E and on the rearward spar 58 the corners of the blades 60 and 61 are attached at the points B, D, H and F.

FIG. 6 is a view looking down from above on the propeller blades 60 and 61 of FIG. 5. From the foregoing it will be seen that the upper blade 60 extends from the point A to the point C on the spar 57, across to the point D on the spar 58, out to the point B and finally across to the beginning point A. Similarly the lower blade 61 shown in FIG. 6 extends from the point E to the point G on the nearer spar 57, then across to the point H on the rearward spar 58, out to the point F and finally across to the beginning point E.

In FIG. 7 the end rod 20 is joined by an articulated connector cord 70, similar to the connector cord 50 shown in FIG. 2, to the end of a drive shaft 71 on the generator 22. The cord 70 extends through lateral holes in the adjacent ends of the end rod 20 and the drive shaft 71 to function in the same manner as the cord 50 described in relation to FIG. 2.

In tests on an actual installation of the wind line 15 comprising six propellers of an outer diameter of four feet of the design shown in FIGS. 5 and 6, the equivalent of approximately 250 to 300 watts of electrical power were developed in a wind of approximately 10 MPH. It will be apparent that as a shift of wind direction occurs the wind line 15 should be displaced angularly to be in substantial alignment with the new wind direction, and for illustrative purposes this is done by moving the post 11 in FIG. 1 angularly with respect to the post 10.

It will be apparent that the wind line of the invention is capable of being folded compactly upon itself simply by articulating the respective rods against one another in accordion fashion so that the rods and the associated propellers are superimposed upon one another. The wind line can be readily transported in this folded condition and hence is useable by campers as a portable power supply, particularly because it can be easily disassembled and reassembled in the field. In contrast, the wind line of the invention may be permanently installed as for example at an ocean front where wind direction and velocity are relatively constant.

The scope of the invention is to be determined by the following claims rather than the foregoing description of preferred embodiment.

I claim:

1. A wind line power system comprising
a) a series of rigid rods arranged end-to-end,
b) connector means joining adjacent pairs of rods in the series permitting both relative angular movement and transmission of axial torque between the joined rods,
c) propeller means extending laterally from at least some of the rods for converting wind force vectors substantially parallel to the rods into cumulative unidirectional axial torque on all of the rods,
d) driven power input means axially rotatably supporting an end rod at one end of the series, and
e) end bearing means axially rotatably supporting an end rod at the opposite end of the series.

2. A wind line power system according to claim 1 wherein the connector means are axially as well as angularly flexible so as to undergo limited torsion before transmitting axial torque between the joined rods.

3. A wind line power system according to claim 1 wherein the series of rigid rods is mounted above ground in a substantially horizontal position.

4. A wind line power system according to claim 3 which includes intermediate bearing means axially rotatably supporting certain of the rods of the series, each intermediate bearing means being substantially vertically suspended from of an overhead support line substantially parallel to the series of rigid rods.

5. A wind line power system according to claim 4 which includes guy lines extending from each intermediate bearing means to ground.

6. A wind line power system according to claim 1 wherein the driven power input means and the end bearing means are both anchored with respect to and elevated above ground.

7. A wind line power system according to claim 1 wherein the driven power input means is a rotatable drive shaft of an electric generator.

8. A wind line power system according to claim 1 wherein each propeller means includes propeller blade spars extending substantially perpendicularly through and spaced axially apart on that rod from which the propeller means extends, the spars being skewed with respect to one another, and sheet material extends between the spars to define respective propeller blade surfaces.

9. A wind line power system according to claim 1 wherein the propeller means are propellers affixed to the respective rods with positions alternating 90° apart from one propeller to the next along the series of rods.

10. A wind line power system comprising
a) a series of rigid rods arranged end-to-end substantially horizontally above ground,
b) articulated connectors joining adjacent pairs of rods in the series permitting both relative universal angular movement and transmission of axial torque between the joined rods,
c) a propeller affixed substantially perpendicular to and coaxial with each of the rods for converting wind force vectors substantially parallel to each associated rod into cumulative unidirectional axial torque on all of the rods,
d) a rotatable drive shaft of an electric generator axially supporting and rotated by one end rod at one end of the series at its extreme outer end, and
e) end bearing means axially rotatably supporting the other end rod at the opposite end of the series at its extreme outer end.

11. A wind line power system comprising
a) a series of rigid rods arranged end-to-end above ground in a substantially horizontal position,
b) articulated connectors joining adjacent pairs of rods in the series permitting both relative universal angular movement and transmission of axial torque between the joined rods and being axially flexible so as to undergo limited torsion before transmitting said axial torque,
c) intermediate bearing means within which associated rods can rotate and be supported and which are substantially vertically suspended from an overhead support line substantially parallel to the series of rods,
d) guy lines extending from each intermediate bearing means to ground,
e) propellers affixed to the respective rods with positions alternating 90° apart from one propeller to the next along the series of rods when all limited torsion is complete in all the connectors and axial torque is transmitted through all of the rods.
f) each propeller including propelling blade spars extending substantially perpendicularly through and spaced axially apart on the associated rod with the spars skewed with respect to one another and with sheet material extending between the spars to define respective propeller blade surfaces,
g) said propellers converting wind force vectors substantially parallel to each associated rod into cumulative unidirectional axial torque on all of the rods,
h) a rotatable drive shaft of an electric generator axially supporting and rotatable by one end rod of the series at its extreme outer end, and
i) end bearing means axially rotatably supporting the other end rod at the opposite end of the series at its extreme outer end.

* * * * *